(12) United States Patent
Kim et al.

(10) Patent No.: US 7,275,257 B1
(45) Date of Patent: Sep. 25, 2007

(54) REMOTE CONTROLLED COMPUTER SYSTEM AND METHOD OF OPERATING THE SAME

(75) Inventors: Dong-Il Kim, Seoul (KR); Hong-Sam Kim, Yongin-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 450 days.

(21) Appl. No.: 09/524,280

(22) Filed: Mar. 13, 2000

(30) Foreign Application Priority Data

Mar. 12, 1999 (KR) ..................... 99-8392

(51) Int. Cl.
*H04L 9/00* (2006.01)
(52) U.S. Cl. ......................................... 726/4
(58) Field of Classification Search ............ 726/4; 713/300
See application file for complete search history.

(56) References Cited

U.S. PATENT DOCUMENTS

| | | | |
|---|---|---|---|
| 3,577,164 A | * 5/1971 | Re Baratelli et al. ..... 290/38 C |
| 3,890,601 A | 6/1975 | Pietrolewicz |
| 4,800,590 A | 1/1989 | Vaughan |
| 4,959,860 A | 9/1990 | Watters et al. |
| 4,964,075 A | * 10/1990 | Shaver et al. |
| 5,768,604 A | * 6/1998 | Yamazaki et al. |
| 5,875,345 A | 2/1999 | Naito et al. |
| 5,895,462 A | * 4/1999 | Toki .............................. 707/3 |
| 5,960,085 A | * 9/1999 | de la Huerga ............. 340/5.61 |
| 6,104,334 A | * 8/2000 | Allport ........................ 341/175 |
| 6,237,846 B1 | * 5/2001 | Lowell et al. |
| 6,292,172 B1 | * 9/2001 | Makhlouf |
| 6,313,851 B1 | * 11/2001 | Matthews, III et al. |
| 6,392,757 B2 | * 5/2002 | Manowitz |
| 6,445,378 B1 | * 9/2002 | Flagg |
| 6,571,299 B1 | * 5/2003 | Schroyer et al. |

OTHER PUBLICATIONS

The American Heritage College Dictionary, 2002, Houghton Mifflin Company, Fourth Edition, pp. 295 and 813.*

* cited by examiner

*Primary Examiner*—Gilberto Barrón, Jr.
*Assistant Examiner*—Jacob Lipman
(74) *Attorney, Agent, or Firm*—Robert E. Bushnell, Esq.

(57) ABSTRACT

In a computer system having a remote controller storing a user identification number, the remote controller generates a remote control signal for remote control of the computer system, and a remote control signal receiver receives the remote control signal from the remote controller. User identification numbers are stored in the remote controller and the remote control signal receiver, respectively. If the two user identification numbers match, a function corresponding to the remote control signal from the remote controller is performed. The function corresponding to the remote control signal corresponds to an assigned button of the remote controller in accordance with power state information of the computer system. The remote control signal can not only execute an assigned program, but also perform an automatic log on of the operating system, such as a windows operating system. As a result, the computer system can carry out batch processing of application programs, including the operating system, in accordance with the remote control signal assigned by the remote controller.

22 Claims, 11 Drawing Sheets

REMOTE CONTROLLED COMPUTER SYSTEM AND METHOD OF OPERATING THE SAME

CLAIM OF PRIORITY

This application makes reference to, incorporates the same herein, and claims all benefits accruing under 35 U.S.C. §119 from an application for REMOTE CONTROLLED COMPUTER SYSTEM AND METHOD OF OPERATING THE SAME earlier filed in the Korean Industrial Property Office on the 12 Mar. 1999 and there duly assigned Serial No. 8392/1999.

FIELD OF THE INVENTION

The present invention relates to a computer system and, more particularly, to a remote controlled computer system and a method of operating the same.

BACKGROUND OF THE INVENTION

On the whole, information is stored in the memory of a computer and/or an external storage device. The information can be private or confidential. In order to prevent unauthorized use, it is therefore desirable to control access to this information. Such a controlled access to computer data can be realized by providing physical (hardware) means for preventing the use of the computer itself or input/output (I/O) devices on a computer system, or by providing software means for restricting access, such as a routine that confirms a user's knowledge of a password before granting that user access to information contained in the computer system.

One commonly-used method for restricting user interaction with a computer is to provide a "password lock" function, which is executed in a central processing unit (CPU) itself or a keyboard controller. Typically, when a keyboard controller is in a "password lock mode", no communication between the keyboard and the CPU of the computer is allowed unless a password is first entered to remove the controller from the "password lock mode". An example of a computer that has a password lock function is the IBM PS/2 desktop models. A password function is commonly included in the power on or boot-up routine executed by the CPU when a power switch is turned on. The password is stored in a non-volatile memory device, rather than a hard disk. When the computer is turned on, machine language code in a startup read only memory (ROM) part of memory is executed, and it is required for the user to input the password. The input password is compared to a password stored in the complementary metal oxide semiconductor (CMOS) random access memory (RAM). If the passwords match, the remaining startup code is executed, and the system becomes operational. If the passwords do not match, however, the startup execution is halted and the system is left inoperable, thereby preventing unauthorized use of the system.

Another commonly used method for restricting a user interaction with a computer is that wherein a system administrator provides a password enabling a user to log in to the computer. This is typically more important in a network system operating with a client operated by a user and a server executing a process according to a requirement of the client. This function is also provided during log on of an operating 8 system (e.g., Windows), such as a routine to set and confirm a user identification number (hereinafter referred to as "ID") and a password. Windows is a registered brand of The Microsoft Corporation, as is Windows 95 or Windows 98 herein.

In order to perform remote control of a computer system having such a security function to protect information, it is necessary to consider the security function provided during confirmation of the complementary metal oxide semiconductor (CMOS) password and log on of the operating system. If such a security function is not considered, a user has to personally input a password during the confirmation and the log on thereof, although the computer system is remotely booted-up by the remote controller. As a result, the remote control of the computer system can be disadvantageous.

U.S. Pat. No. 4,959,860 to Jeffrey S. Watters et al. entitled Power-on Password Functions for Computer System, discloses a RAM (random access memory) receiving power from a battery that maintains the password when system power is turned off. However, Watters '860 does not refer to a security function of a computer operated by a remote controller. Watters '860 discloses a power-on password security function for a digital computer system that allows the system software to distinguish between authorized and unauthorized users. Safeguards are provided to prevent corruption of password data which could lead to a lock-out of authorized users, and redundant checks allow the security function to operate even when first-level checks fail. The latter patent discloses a battery-powered RAM storage area used to hold the password when the system is turned "off", and that storage area is protected against being accessible by unauthorized users when the system is turned "on".

U.S. Pat. No. 4,800,590 to Vaughan, entitled Computer Key And Computer Lock System, discloses a computer access system that includes a password generator and a lock computer connected to receive passwords generated by the password generator and to grant access to a host computer when a password from the password generator matches a password separately generated by the lock computer. The patent discloses that the password generator and the lock computer have corresponding pseudo-random number sequences stored in memories. The password generator and the lock computer have synchronized clocks, which define time intervals. It is further disclosed that, during a given time interval, entry of a personal identification number in the password generator will cause the password generator to generate a unique password from the random number sequence in the memory and time interval information from the clock. The user transmits the generated password to the lock computer, which independently generates a comparison password from the corresponding pseudo-random number sequence stored in the memory, and the time interval defined by the clock. If the passwords match, access to the computer is granted by the lock computer. Since the valid passwords change with each time interval, subsequent use of an intercepted password will not grant access to the computer.

U.S. Pat. No. 3,890,601 to Pietrolewicz, entitled Password Operated System For Preventing Unauthorized Or Accidental Computer Memory Alteration, discloses that manipulation of a digital computer magnetic memory is locked out to prevent unauthorized or accidental erasure. The memory is provided with a unique password. It is disclosed that, unless the correct password is present in the computer, or entered into the computer by the operator, the computer will not run and the memory cannot be altered.

SUMMARY OF THE INVENTION

Therefore, an object of the present invention is to provide a remote control function for a computer system having a security function.

In remote control of the computer system by means of a remote controller, another object of the present invention is to provide a computer system carrying out an automatic log on function of an operating system and a batch processing function of an assigned program, and to provide a method of operating the same.

According to a first aspect of the present invention, the computer system includes: a computer; a remote controller for storing user identification number, and for generating a remote control signal, including the user identification number, and a command code for remote control of the computer system; a remote control signal receiver connected to the computer for storing the same user identification number as the user identification number of the remote controller, and for receiving the remote control signal from the remote controller; and program driving means for carrying out an operating system automatic log on function and an assigned program automatic execution function in accordance with the remote control signal from the remote controller when the two user identification numbers match.

In an embodiment according to a first aspect of the present invention, the remote controller includes: a first memory for storing a user identification number; a first command button for inputting a command for automatically executing an operating system; a second command button for performing an automatic log on of the operating system and then automatically executing a first program; a third command button for performing an automatic log on of the operating system and then automatically executing a second program; a first microcontroller for generating a remote control signal, including a command code corresponding to a selected command button and a user identification number stored in the first memory, when one of the first to the third command buttons is selected; a remote control signal transmission circuit using one of an infrared signal and a radio frequency (RF) signal in order to transmit the remote control signal to the remote control signal receiver of the computer system; and a power supply for supplying operating power for the remote controller.

In the embodiment according to the first aspect of the present invention, the remote control signal receiver includes: a second memory having a user identification number; a remote control signal receiving circuit for receiving a remote control signal from the remote controller using one of an infrared signal and a radio frequency (RF) signal; and a second microcontroller for receiving the remote control signal and a power state signal of the computer, and for determining whether a user identification number included in the received remote control signal matches a user identification number stored in the second memory. The microcontroller inputs the command code to the program driving means when the two user identification numbers match.

In the embodiment according to the first aspect of the present invention, a power state of the computer system is one of a normal state, a stand-by state, and a system off state. Further, the remote control signal is executed in accordance with the power state thereof and does not have a turn-off function in order to prevent data loss caused by a shutdown of an operation when the remote controller mistakenly inputs information. Moreover, if the two user identification numbers match when the computer system is booted by means of the remote controller, a step of checking a set password is automatically skipped.

Also, in the embodiment according to the first aspect of the present invention, the program driving means includes: a virtual keyboard driver for confirming whether a command code transmitted from the remote controller to the remote control signal receiver is input, and then generating a control command; means for responding to the command code and control command to automatically execute a program; and auto log means for carrying out an automatic log on of an operating system when the computer system is booted by means of the remote controller when the user identification number matches the user identification number of the remote control signal receiver. The auto log means automatically inputs a user identification number and a password, which are necessary for a log on of the operating system.

Additionally, in the embodiment according to the first aspect of the present invention, the program driving means resides in the computer to be displayed with a shape of a tray icon and responds to the command code transmitted from the remote controller to automatically execute an assigned program, with a first and a second program assigned through the second and the third command buttons being variable.

According to a second aspect of the present invention, a method for remote control of a computer system in response to a remote control signal from a remote controller includes the steps of: checking a signal receiving state of a remote control signal receiver to determine whether the remote control signal is input from the remote controller; determining whether a user identification number included in the received remote control signal matches a user identification number stored in the remote control signal receiver when the remote control signal is input therefrom; standing by until the remote control signal is input therefrom when the remote control signal is not input from the remote controller; and performing a function corresponding to the received remote control signal in accordance with a power state of the computer system when the two user identification numbers match. The power state of the computer system is one of a normal state, a stand-by state, and a system off state.

In the embodiment according to the second aspect of the present invention, the remote control signal includes: a first command generated by a first command button of the remote controller in order to carry out an automatic log on of the operating system; a second command generated by a second command button of the remote controller in order to carry out the automatic log on of the operating system and automatically execute a first program; and a third command generated by a third command of the remote controller in order to carry out the automatic log on of the operating system and automatically execute a second program.

Also, in the embodiment according to the second aspect of the present invention, the function corresponding to the remote control signal is executed in accordance with the power state of the computer system and the remote control signal does not have a turn-off function in order to prevent data loss caused by shutdown of an operation when the remote controller mistakenly input information.

Further, in the embodiment according to the second aspect of the present invention, a method of carrying out an auto log on of the operating system for the computer system and automatically executing the first program or the second program includes the steps of: powering on the computer system; carrying out booting by means of a basic input/output system (BIOS); automatically skipping a step of checking a complementary metal oxide semiconductor (CMOS) password; carrying out booting by means of an operating system; performing an auto log on of the operating system by means of an auto log means; driving a launcher shell program in order to automatically execute an assigned program; determining whether the first or the second program execution button is selected; and executing a selected program by means of the first or the second program execution button when the corresponding first or second button is selected.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DESCRIPTION OF THE PREFERRED EMBODIMENTS

A computer according to the present invention includes a remote controller generating a remote control signal for remote control of the computer system, and a remote control signal receiver receiving the remote control signal from the remote controller. User identification numbers are stored in the remote control signal receiver and the remote controller, respectively. If the two user identification numbers match, the function corresponding to the remote control signal from the remote controller is performed. In that case, an assigned program is automatically performed and an automatic log on function for the operating system, such as Windows, is performed by means of the remote control signal from the remote controller.

Figure 1:
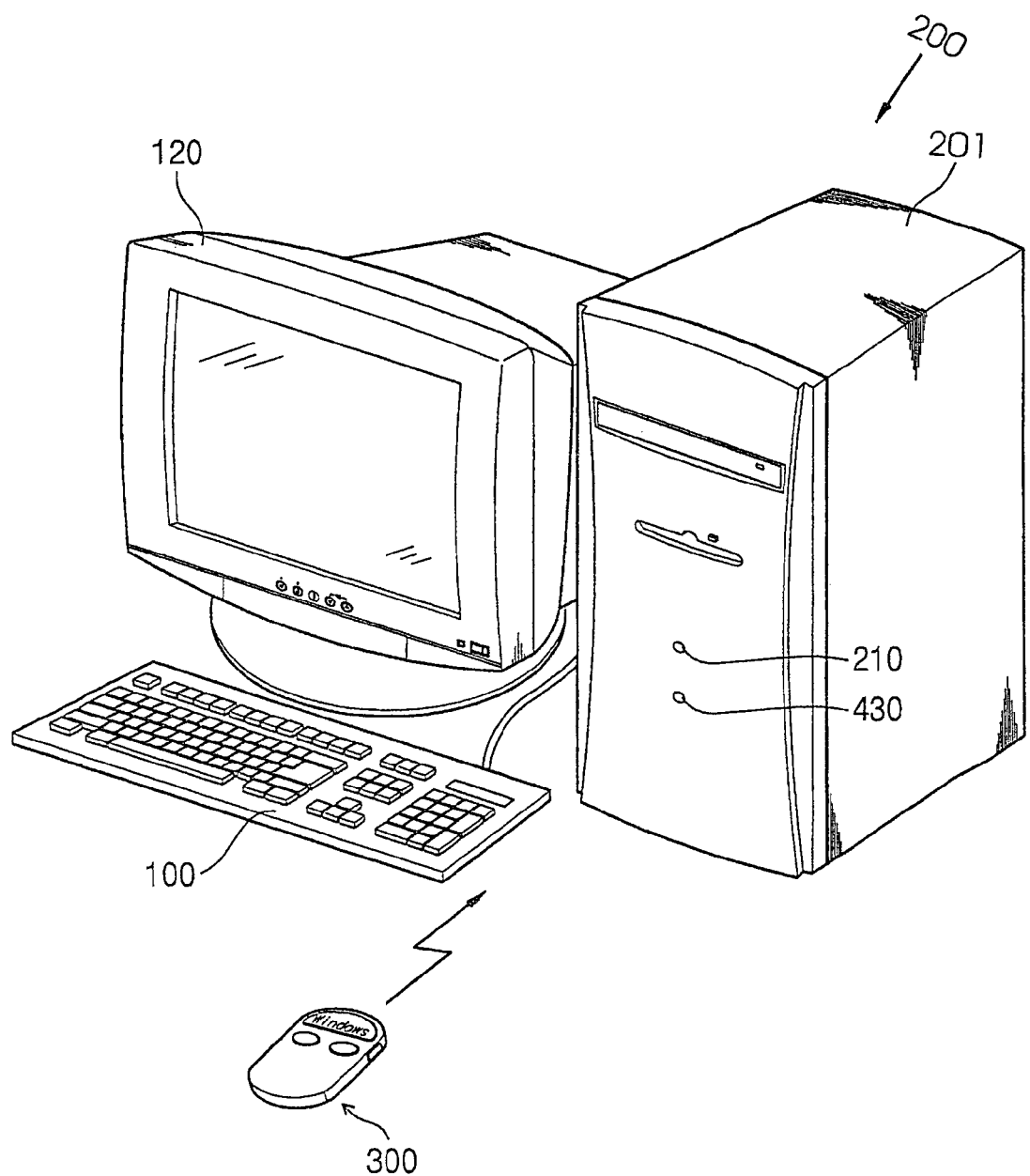
FIG. 1 is a perspective view illustrating a computer system having a remote controller according to the present invention.
Figure 2A:
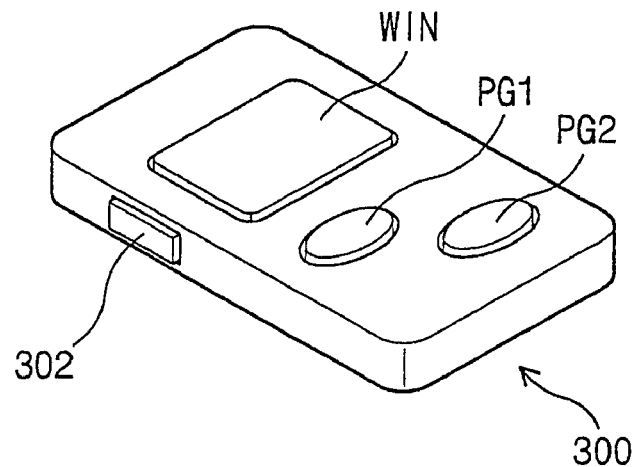
FIGS. 2A and 2B are perspective views illustrating remote controllers according to the present invention.
Figure 2B:
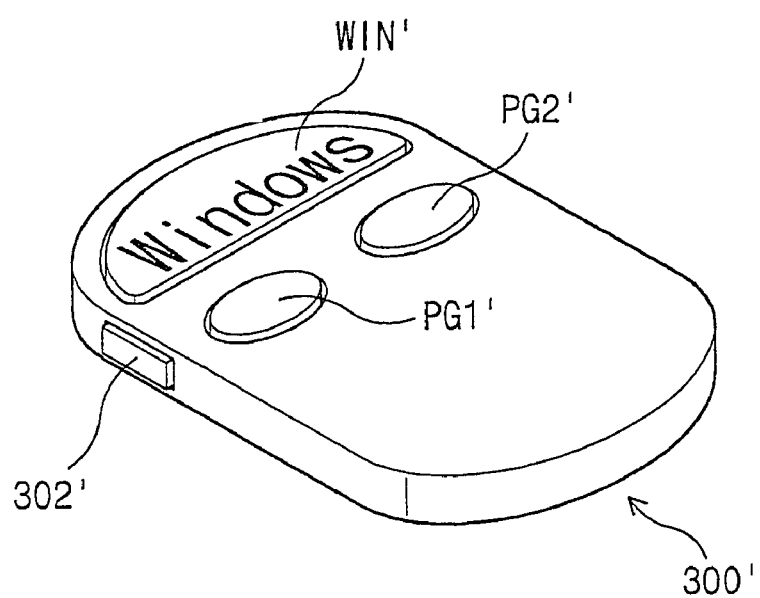
Figure 3:
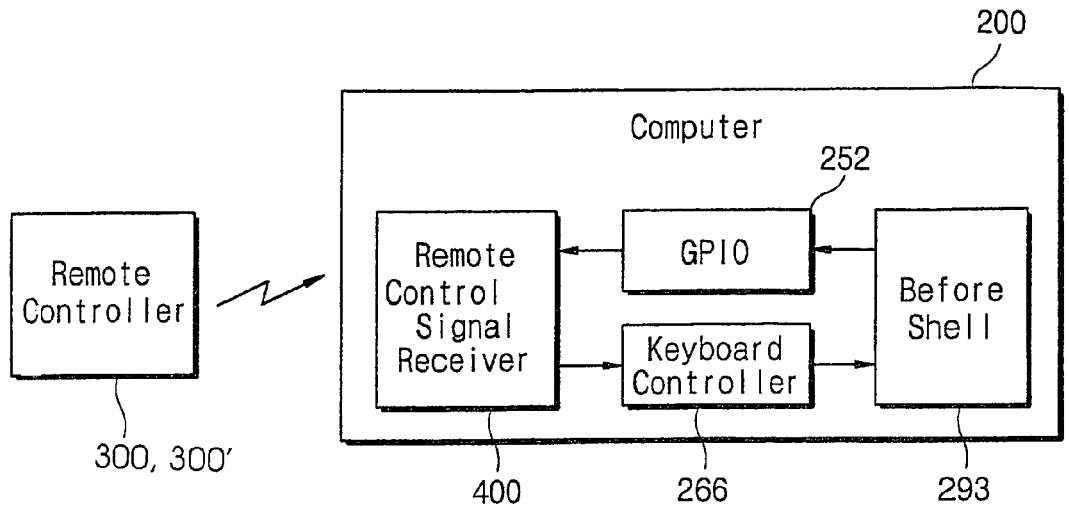
FIG. 3 is a block diagram illustrating the structure of a computer system, including a remote controller and a remote control signal receiver, as shown in FIG. 1, according to the present invention.

FIG. 1 illustrates a computer system 200 including a computer 201 and having a remote controller 300 according to the present invention; FIGS. 2A and 2B illustrate remote controllers 300, 300' according to the present invention; and FIG. 3 illustrates the structure of a computer system 200, including a remote controller and a remote control signal receiver, as shown in FIG. 1. The computer system 200 can be driven by operating a power switch 210 of computer 201, and can remotely be driven by means of remote controller 300, 300', as well.

As shown in FIGS. 2A and 2B, each of remote controllers 300 and 300' includes an on/off switch 302, 302' mounted upon one side thereof and a plurality of command selection buttons, such as a window selection button WIN, WIN', a first program selection button PG1, PG1' and a second program selection button PG2, PG2,' mounted upon an upper surface thereof. The on/off switch 302, 302' is used to control power on/off of the remote controller 300, 300' operated by a battery 340 (FIG. 4), and the command selection buttons WIN, WIN', PG1, PG1' and PG2, PG2' are used to generate remote control signals for remote control of the computer system 200. The window selection button WIN, WIN' is used to generate a command executing a log on operation of the computer system 200. The first and the second selection buttons PG1, PG1' and PG2, PG2' are used to generate a command not only for performing a windows log on of the computer system 200 but also for automatically executing a first program and a second program. The operations performed in the remote controller 300' of FIG. 2B typically are the same as the operations performed in the remote controller 300 of FIG. 2A. The remote controllers 300 and 300' have the same structure desirably, although they can differ in external appearance. The first, second and third command buttons correspond to the WIN, PG1 and PG2 functions, respectively, of controller 300 of FIG. 2A. Similarly, the first second and third command buttons correspond to the WIN', PG1' and PG2' functions, respectively, of controller 300' of FIG. 2B. The first command button is the window selection button WIN, WIN', the second command button is the first program selection button PG1, PG1', and the third command button is the second program selection button PG2, PG2'.

Figure 6:
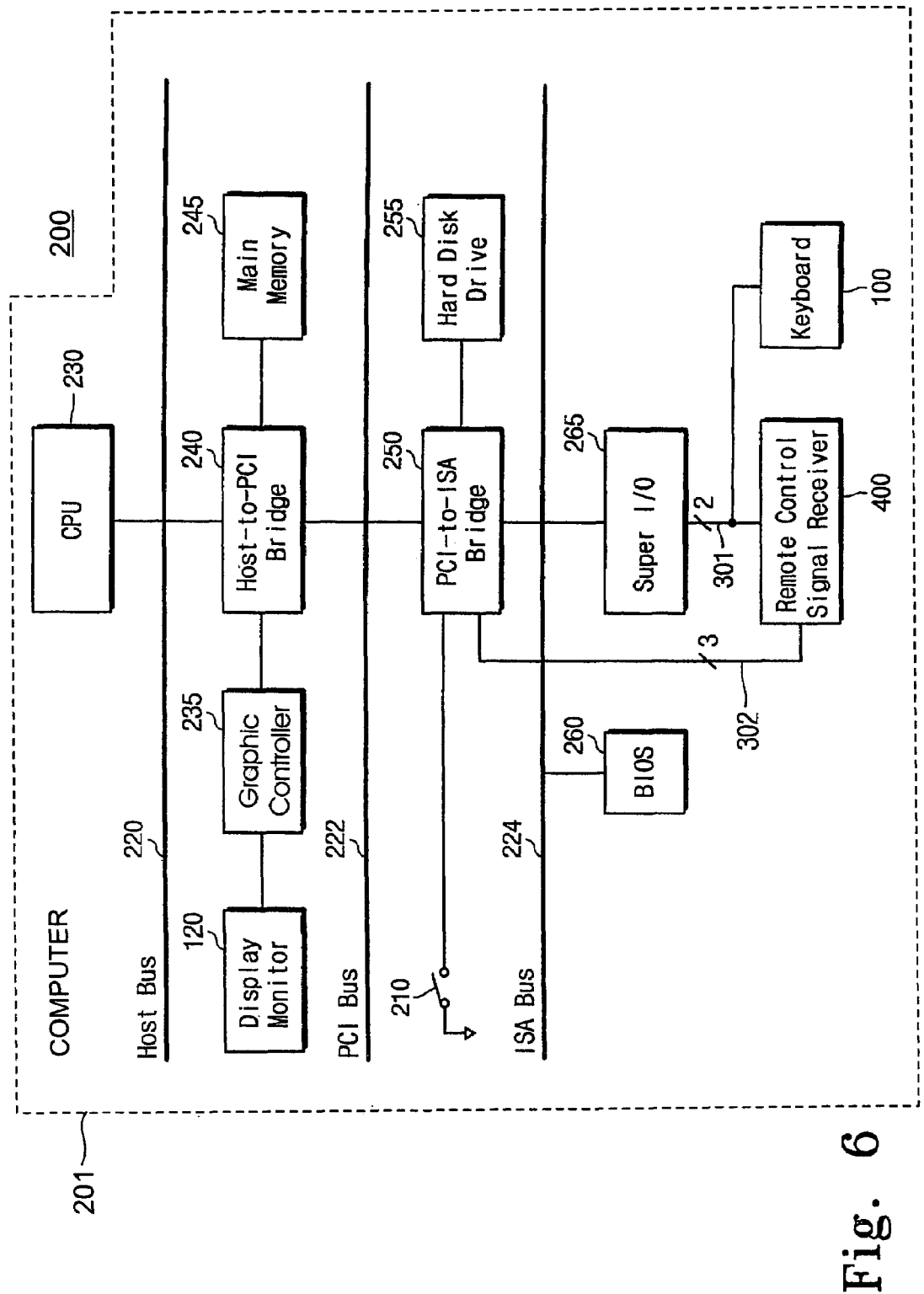
FIG. 6 is a diagram illustrating the structure of a computer system, equipped with the remote control signal receiver shown in FIG. 3, according to the present invention.

Referring now to FIG. 3, a remote control signal generated from the remote controller 300, 300' is transmitted to a remote control signal receiver 400 mounted in computer system 200, and controls operation of the computer system 200. The remote control signal receiver 400 is mounted therein, and is coupled to a general purpose input output (GPIO) 252 of the computer system 200 and a keyboard controller 266 of a super I/O 265 (FIG. 6). Super I/O 265 is an integrated input/output (I/O) controller. The super I/O controller 265 can support plural IDE hard drives, plural floppy drives, plural standard Com ports, a parallel port and a games port, for example. A before shell. 293 (FIG. 3), which is a program execution means or program driving means, is coupled to the GPIO 252 and the keyboard controller 266. The before shell 293 receives a remote control signal from remote control signal receiver 400 through the keyboard controller 266, and then executes a function corresponding to the signal. Further, the before shell 293 transmits power state information to the remote control signal receiver 400 through the GPIO 252. If the two user identification numbers match, it is possible to carry out remote control of the computer system 200 using such a remote controller 300, 300'. The user identification number and confirming steps thereof will be described in detail as follows.

Figure 7:
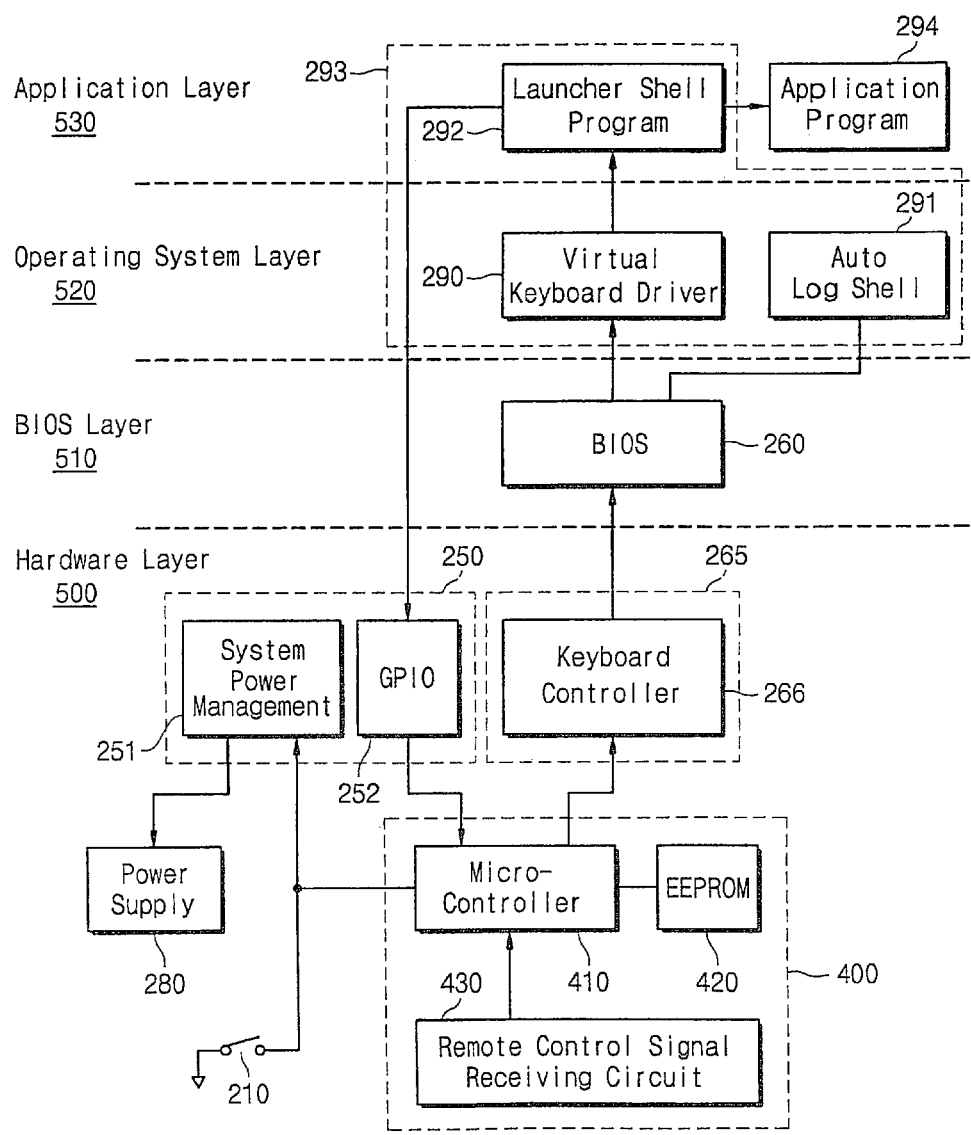
FIG. 7 is a hierarchical view illustrating the structure of a computer system shown in FIG. 6 according to the present invention.

The before shell 293 is composed of a virtual keyboard driver 290, an auto log shell 291, and a launcher shell program 292 (FIG. 7). The remote control signal transmitted from the remote controller 300, 300' (FIG. 3) to the remote control signal receiver 400 is executed by the virtual keyboard driver 290 (FIG. 7) and the launcher shell program 292. The launcher shell program 292 transmits state information of the computer system 200 to a general purpose input output (GPIO) 252 included in a PCI-to ISA bridge 250 (FIG. 7). PCI-to-ISA bridge 250 is, for example, a well known "PCI-to ISA bridge controller". An example of a PCI-to-ISA bridge controller is disclosed in "Platform Components Databook", by Intel Corporation, January 1998, pp. 221-496. Generally, a GPIO, such as GPIO 252, is included in the PCI-to-ISA bridge controller, such as PCI-to-ISA bridge 250. That is, if the remote control signal from the remote controller 300, 300' (FIG. 3) is transmitted to the remote control signal receiver 400, a key code of the command included in the remote control signal is supplied to the keyboard controller 266 (FIG. 7). At this time, a microcontroller 410 (FIG. 7), included in the remote control signal receiver 400, records information for remote control in a specific region of the basic input/output system (BIOS) 260 (FIG. 7). If booting is performed by means of the remote controller 300, 300', the auto log shell 291 can automatically input a user identification number and a password requisite for the log on of the windows without passing through a CMOS password check in accordance with a booting routine stored in the BIOS 260. The virtual keyboard driver 290 of the before shell 293 analyzes a value of the key code, and then transmits a control command for automatic execution of a program to the launcher shell program 292. The launcher shell program 292 responds to the command from the virtual keyboard driver 290, and then automatically executes a program assigned by selecting a command button of the remote controller 300, 300'.

Figure 4:
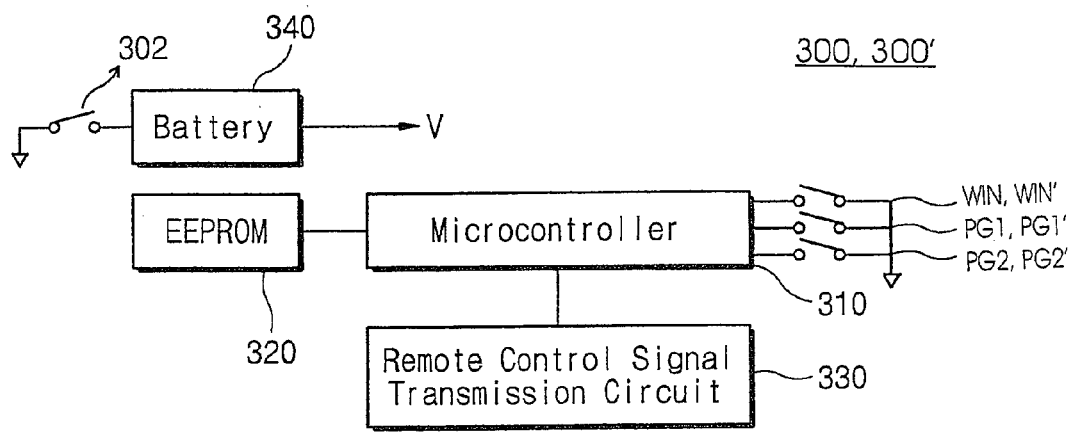
FIG. 4 is a diagram illustrating the structure of a remote controller shown in FIG. 3 according to the present invention.
Figure 5:
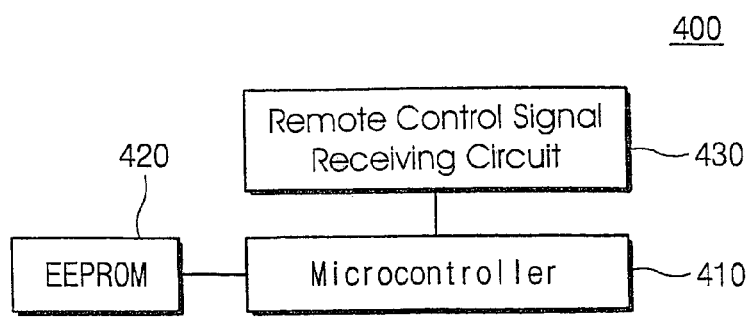
FIG. 5 is a diagram illustrating the structure of a remote control signal receiver shown in FIG. 3 according to the present invention.

FIG. 4 and FIG. 5 illustrate the respective structures of a remote controller 300, 300' and a remote control signal receiver 400 shown in FIG. 3. Referring now to FIG. 4, the remote controller 300, 300' includes an electrically erasable read only memory (EEPROM) 320 for storing a user identification number, a microcontroller 310 for generating a computer remote control signal, including the user identification number stored in the remote controller and a command input from one of the command buttons WIN, WIN', PG1, PG1' and PG2, PG2' shown in FIGS. 2A and 2B, a remote control signal transmission circuit 330 for transmitting the remote control signal to the remote control signal receiver 400, and a battery 340 for providing operating power of the remote controller 300 upon closure of switch 302. The microcontroller 310 is coupled between the EEPROM 320 and the remote control signal transmission circuit 330, particularly carrying out a function to control a series of operations generating a remote control signal, and then transmitting the signal through the remote control signal transmission circuit 330. Although the present invention desirably uses EEPROM 320 in order to store a user identification number, a memory device can be composed of, for example, an erasable programmable read only memory (EPROM) or a ROM. In transmission of the remote control signal, the remote control signal transmission circuit 330 can use one of an infrared signal and a radio frequency (RF) signal, with the use of the infrared signal being desirable.

Referring now to FIG. 5, the remote control signal receiver 400 includes an EEPROM 420, a remote control signal receiving circuit 430, and a microcontroller 410. In the EEPROM 420, a user identification number the same as that of remote controller 300, 300' is stored. The remote control signal receiving circuit 430 receives a remote control signal from the remote controller 300, 300'. The microcontroller 410 determines whether the user identification number of the remote controller 300, 300' included in the remote control signal matches the user identification number stored in the EEPROM 420. If the two user identification numbers match, a command included in the remote control signal is carried out. The remote control signal receiving circuit 430 corresponds to the remote control signal transmission circuit 330, and can receive one of an infrared signal and a radio frequency (RF) signal, with the infrared signal being desirable.

FIG. 6 illustrates the structure of a computer system 200 equipped with the remote control signal receiver 400 shown in FIG. 3. Referring now to FIG. 6, a computer 201 of computer system 200 has a remote control signal receiver 400 for receiving a remote control signal from a remote controller 300, 300', and includes a plurality of data buses including a host bus 220, a PCI bus 222, and an ISA bus 224, a central processing unit (CPU) 230, a display monitor 120, a graphic controller 235, a HOST-to-PCI bridge 240, and a main memory 245 connected in series between the host bus 220 and the PCI bus 222. The computer 201 of computer system 200 further includes a power switch 210, a PCI-to-ISA bridge 250, and a hard disk drive 255 connected in series between the PCI bus 222 and the ISA bus 224, and a BIOS 260 and a super I/O 265 connected in parallel between the ISA bus 224 and the remote control signal receiver 400, respectively. The CPU 230, the Host-to-PCI bridge 240, the PCI-to-ISA bridge 250, the super I/O 265, and the remote control signal receiver 400 are connected in series. The PCI-to-ISA bridge 250 is connected to the remote control signal receiver 400 in order to transmit state information (e.g., a normal state, a stand-by state, and an off state) of the computer system 200 to the remote control signal receiver 400. A keyboard 100 is connected between the super I/O 265 and the remote control signal receiver 400. When a user identification number included in a remote control signal transmitted from the remote controller 300, 300' matches a user identification number stored in the remote control signal receiver 400, the remote control signal receiver 400 transmits a key code, corresponding to the remote control signal transmitted from the remote controller 300, 300', to the super I/O 265. After execution of the remote control signal, the state information of the computer system 200 is transmitted to the remote control signal receiver 400 through a GPIO 252 (FIGS. 3 and 7) of the PCI-to-ISA bridge 250.

FIG. 7 illustrates the hierarchical structure of computer system 200 shown in FIG. 6. Referring now to FIG. 7, computer system 200 has a hierarchical structure which includes a hardware layer 500, a BIOS layer 510, an operating system layer 520, and an application layer 530. In parts related to remote control, the hardware layer 500 includes a PCI-to-ISA bridge 250, a super I/O 265, and a remote control signal receiver 400. The PCI-to-ISA bridge 250 includes a system power management 251 and a GPIO 252. A power supply 280 and a power switch 210 are connected to the system power management 251. The PCI-to-ISA bridge 250 and the super I/O 265 are connected to a microcontroller 410 of the remote control signal receiver 400, transmitting a state signal and a remote control signal of the computer system 200. A remote control signal from the microcontroller 410 is transmitted to a keyboard controller 266 included in the super I/O 265, and controls operation of the computer system 200. The BIOS layer 510 includes a BIOS 260. The operating system layer 520 includes a virtual keyboard driver 290 and an auto log shell 291 for performing an auto log on of the operating system, such as a windows operating system. The application layer 530 includes a launcher shell program 292 for automatically performing a program and other application programs 294. The virtual keyboard driver 290, the auto log shell 291, and the launcher shell program 292 are collectively referred to as a before shell 293.

The before shell 293 can execute functions corresponding to the remote control signal transmitted from the microcontroller 410 of the remote control signal receiver 400 through the virtual keyboard driver 290 and the launcher shell program 292. The launcher shell program 292 can transmit state information of the computer system 200 to the GPIO 252 included in the PCI-to-ISA bridge 250. That is, if the remote control signal from the remote controller 300, 300' is transmitted to the remote control signal receiver 400, a key code of the command included in the remote control signal is supplied to the keyboard controller 266. At this time, the microcontroller 410 records information for remote control in a specific region of the BIOS 260. If booting is performed by means of the remote controller 300, 300' in accordance with a booting routine stored in the BIOS 260, the auto log shell 291 can automatically input a user identification number and a password required for the log on of the operating system, such as a windows operating system. The virtual keyboard driver 290 of the before shell 293 analyzes a value of the key code, and then transmits a control command for automatic execution of a program to the launcher shell program 292. The launcher shell program 292 responds to the command from the virtual keyboard driver 290, and then automatically executes a program assigned by the selecting of a command button of the remote controller 300, 300'.

Figure 8:
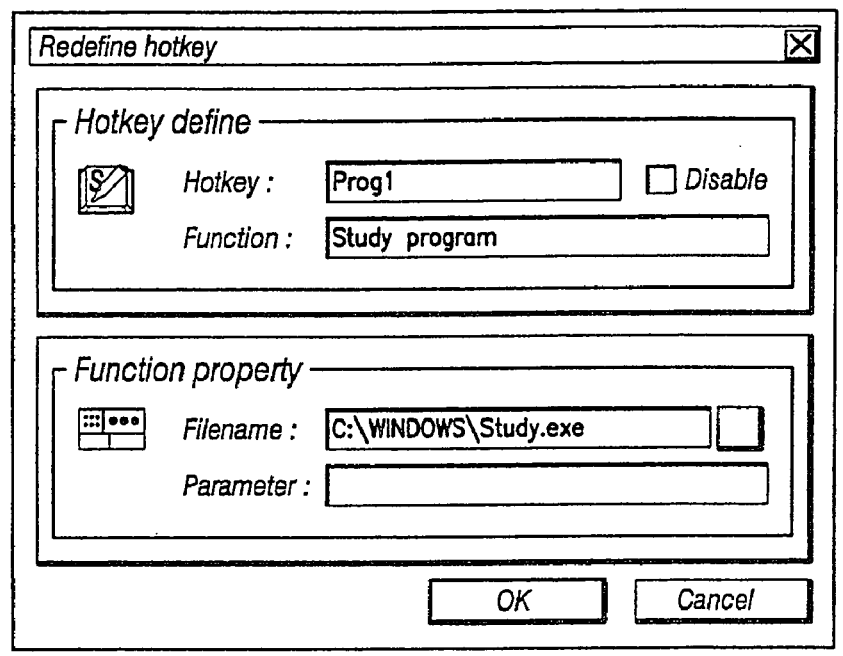
FIG. 8 is a diagram illustrating a window of a before shell program for redefining programs appointed by the second or the third command buttons of the remote 11 controller according to the present invention.
Figure 9:
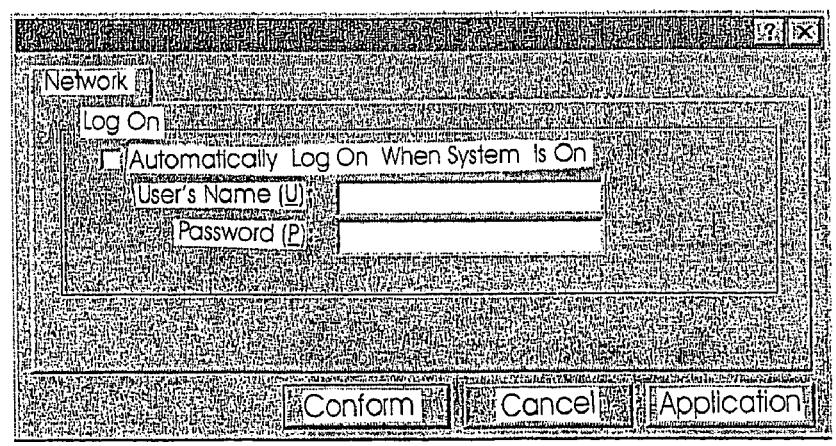
FIG. 9 is a diagram illustrating a screen in which a user identification number and a password for a windows log on are input in the present invention.

FIG. 8 illustrates a feature of the before shell 293 during execution thereof, and FIG. 9 illustrates a screen by means of which a user identification number and a password for windows log on are input. The before shell 293 resides in the computer 201 of computer system 200 and is displayed with the shape of a tray icon, as illustrated in FIG. 8, so that a user can always call up the before shell 293. As shown in FIG. 8, the before shell 293 enables a user to optionally vary or store a first program and a second program remotely executed by the first and the second program selection buttons PG1, PG1' and PG2, PG2'. When the remote controller 300, 300' remotely powers on the computer system 200, a user need not personally input a user identification number or a password on a state window because the log on of the window is performed by means of the auto log shell 291. The above information relating to the user identification number and password is stored in a registry region for driving the operating system, such as a windows operating system.

Figure 10:
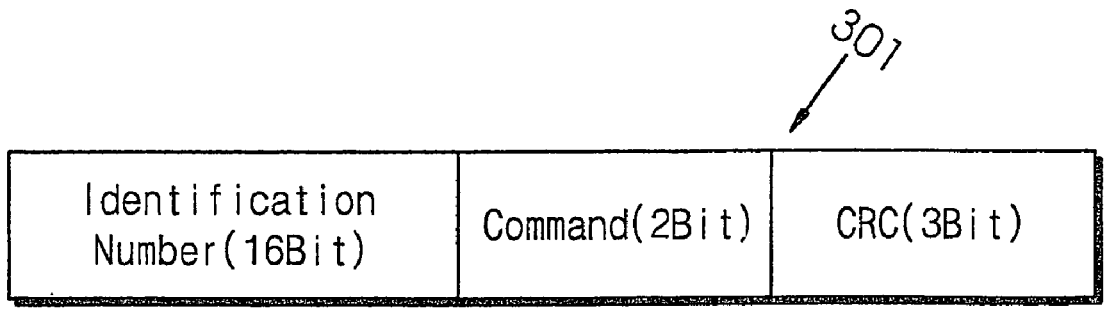
FIG. 10 is a diagram illustrating the shape or configuration of a remote control signal generated in the remote controller according to the present invention.

FIG. 10 illustrates the shape or configuration of a remote control signal 301 generated by remote controller 300, 300' according to the present invention. Referring now to FIG. 10, the remote control signal 301 from the remote controller 300, 300' includes a user identification number stored therein and a command for control. That is, the remote control signal 301 uses 16 bits for the user identification number, 2 bits for transmitting a command for controlling the computer system 200 as a key code, and 3 bits for cyclic redundancy check (CRC) data to correct an error. A value of the key code is assigned to a plurality of the command buttons WIN, WIN', PG1, PG1', and PG2, PG2' supplied to the remote controller 300, 300', respectively. "TABLE 1" shows the values assigned to each of the command buttons WIN, PG1, and PG2 for remote controller 300, by way of example.

TABLE 1

| Button | Key Code | Remark |
| --- | --- | --- |
| WIN | E0 1F 14 11 15 E0 F0 1F F0 14 F0 11 F0 15 | CTRL + WIN + ALT + Q |
| PG1 | E0 1F 14 11 1D E0 F0 1F F0 14 F0 11 F0 1D | CTRT + WIN + ALT + W |
| PG2 | E0 1F 14 11 24 E0 F0 1F F0 14 F0 11 F0 24 | CTRT + WIN + ALT + E |

For example, if the windows selection button WIN of the remote controller 300 is pressed, a key code value corresponding thereto is transmitted to the keyboard controller 266 of the super I/O 265 through the remote control signal receiver 400 (referring to FIG. 7). This has the same effect as simultaneous pressing of the "CTRL, WIN, ALT, and Q" buttons on keyboard 100. Similarly, if the first or the second program selection button PG1 or PG2 is pressed, each of key code values shown in the "TABLE 1" is included in the remote control signal, and then is also transmitted to the keyboard controller 266 of the super I/O 265 through the remote control signal receiver 400 (referring to FIG. 7).

Figure 11:
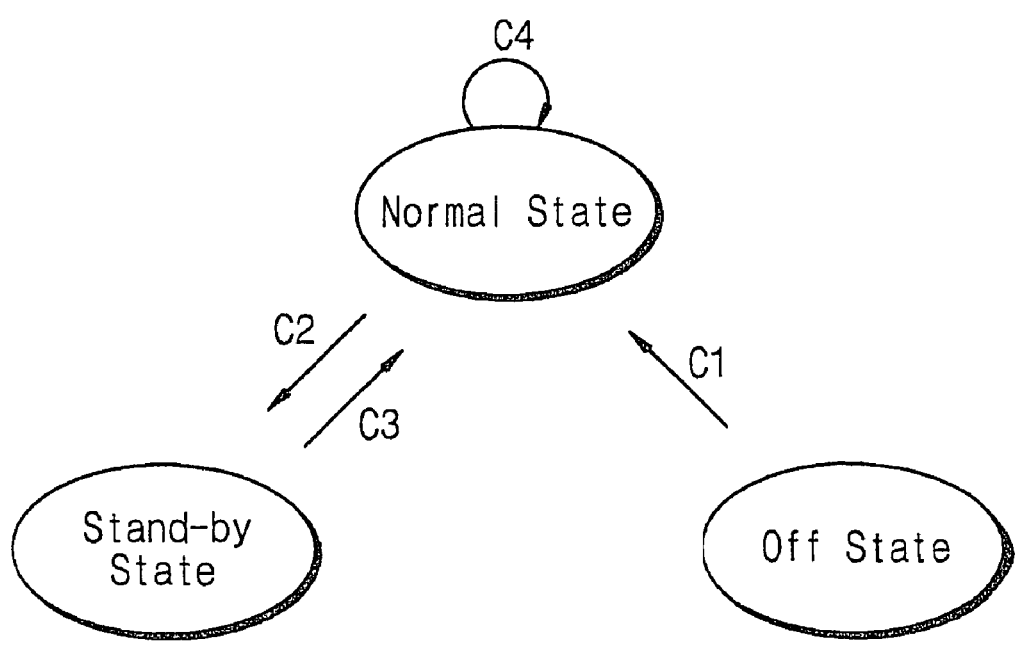
FIG. 11 is a state view illustrating the transition of a power state of a computer system in response to a remote control signal according to the present invention.

FIG. 11 illustrates the transition of the power state of a computer system according to a remote control signal from controller 300, 300'. Referring now to FIG. 11, the power state of computer system 200 is one of a normal state, a stand-by state, and an off state. The control by the remote controller 300 is dependent upon the power state thereof. For example, if the windows selection button WIN, WIN' is selected when the computer system 200 lies in the off state, the computer system 200 is booted and the automatic log on of the windows is carried out. In that case, the power state of the computer system 200 is changed from the off state to the normal state (refer to arrow C1). If the first program selection button PG1, PG1' is selected, the computer system 200 is booted and the automatic log on of the windows is carried out, thereafter executing an assigned first program. Similarly, if the second program selection button PG2, PG2' is selected, the computer system 200 is booted and the automatic log on of the windows is carried out, thereafter executing an assigned second program. In these cases, the power states of the computer system 200 are changed from the off state to the normal state (refer to arrow C1) as when the windows selection button WIN, WIN' is selected. In addition, if the window selection button WIN, WIN' is selected when the computer system 200 is in a normal state, the computer system 200 is converted into the stand-by state (refer to arrow C2). If the first program selection button PG1, PG1' is selected, the first program is automatically executed, and the computer system 200 is kept in the normal state (refer to arrow C4). If the second program selection button PG2, PG2' is selected, the second program is automatically executed, and the computer system 200 is kept in the normal state (refer to arrow C4). Moreover, if the windows selection button WIN, WIN' is selected when the computer system 200 is in the stand-by state, the state of the computer system 200 is converted into the normal state (refer to arrow C3). If the first or the second program selection button PG1, PG1' or PG2, PG2' is selected, no operation is carried out. In order to prevent data loss caused by shutdown of operation when the remote controller mistakenly inputs information, the computer system and method of the present invention desirably do not have a turn-off function.

The remote control operation of the computer system 200 using remote controller 300, 300' will now be described in detail.

Figure 12:
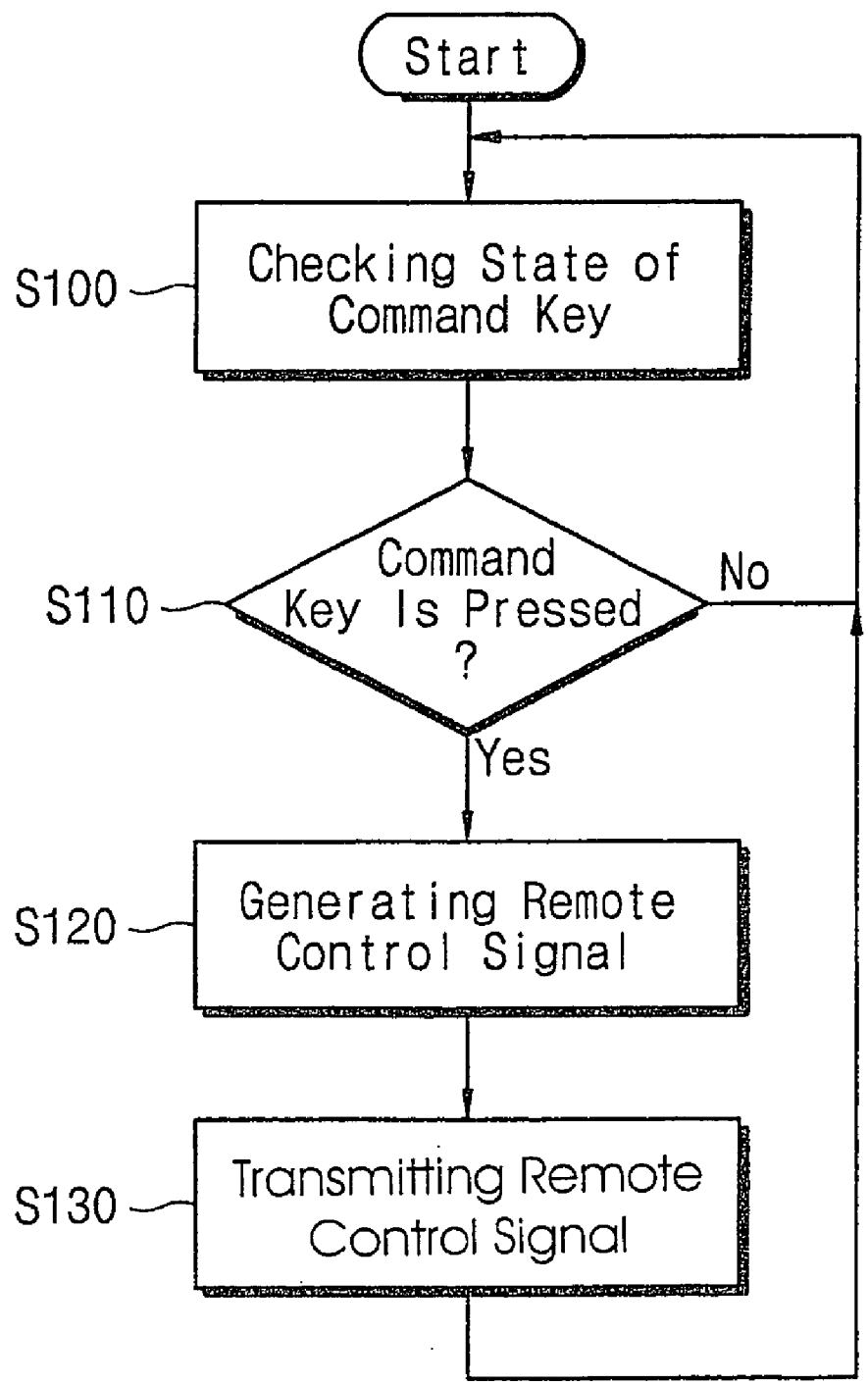
FIG. 12 is a flowchart illustrating the operating steps of the remote controller shown in FIG. 4 according to the present invention.

FIG. 12 illustrates the operating steps of remote controller 300, 300' shown in FIG. 4. Referring now to FIG. 12, in step S100, microcontroller 310 included in the remote controller 300, 300' checks the states of the command buttons WIN, WIN' PG1, PG1' and PG2, PG2'. Then, in step S110, the microcontroller 310 determines whether one of the command buttons WIN, WIN' PG1, PG1' and PG2, PG2' is pressed. If one of the command buttons is pressed, then in step S120 a remote control signal, including a command key code, is generated by selecting a user identification number stored in the EEPROM 320 and one of the command buttons WIN, WIN' PG1, PG1' and PG2, PG2'. Then, in step S130, the remote control signal is transmitted to the remote control signal receiver 400 by a remote control signal transmission circuit 330, and then the control flow returns to step S100, wherein the microcontroller 310 again checks the state of the command buttons.

Figure 13:
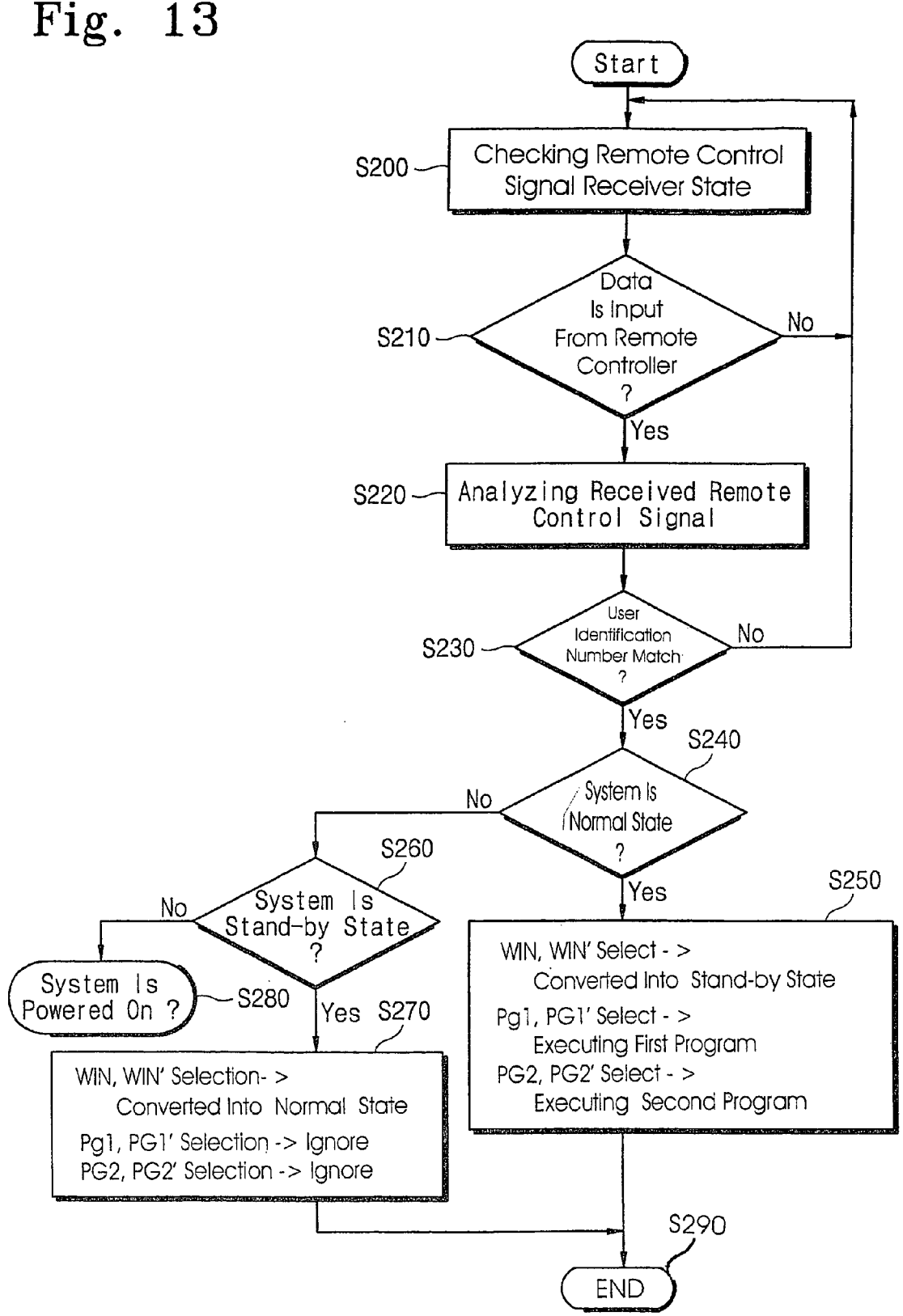
FIG. 13 is a flowchart illustrating the operating steps of the remote control signal receiver shown in FIG. 5 according to the present invention.

FIG. 13 illustrates the operating steps of the remote control signal receiver 400 shown in FIG. 5. Referring now to FIG. 13, in step S200, microcontroller 410 checks the state, such as the signal receiving state or the signal not receiving state, of remote control signal receiver 400. Then, in step S210, the microcontroller 410 determines whether the remote control signal is transmitted or input from the remote controller 300, 300'. If the remote control signal is not input, step S210 returns to step S200 to check the state of the remote control signal receiver 400. If the remote control signal is input, the microcontroller 410 analyzes the remote control signal received therefrom in step S220, and the procedure is as follows. Initially, a user identification number is separated from the remote control signal. Afterwards, in step S230, the microcontroller 410 determines whether the user identification number matches a user identification number stored in the remote control signal receiver 400. If the user identification numbers do not match, step S230 returns to step S200 to check the state of the remote control receiver 400. If the user identification numbers do match, step S230 proceeds to step S240 to determine whether the power state of the computer system 200 is the normal state. If it is the normal state, step S240 proceeds to step S250 to perform a remote control operation by means of a command code included in the remote control signal. At this time, if the windows selection button WIN, WIN' is selected, the microcontroller 410 converts the power state of the computer system 200 into the stand-by state. If the first program selection button PG1, PG1' is selected, an assigned first program is executed. Further, if the second program selection button PG2, PG2' is selected, an assigned second program is executed. The process then ends at step S290.

If the computer system 200 is determined not to be in the normal state in step S240, step S240 proceeds to step S260 to determine whether the power state of the computer system 200 is the stand-by state. If the power state of the computer system 200 is not the stand-by state, the computer system 200 lies in the off state. Then, accordingly, in step S280, the microcontroller 410 powers on the system. If the computer system 200 s5 is determined to be in the stand-by state in step S260, step S260 proceeds to step S270 to perform a remote control operation by a key code included in the remote control signal, similar to the procedure in step S250. At this time, if the window selection button WIN, WIN' is selected, the power state of the computer system 200 is converted into the normal state. If the first or the second program selection button PG1, PG1' or PG2, PG2' is selected, input of the program selection button PG1, PG1' or PG2, PG2' is ignored so as to perform no further operation. The process then ends at step S290.

Figure 14A:
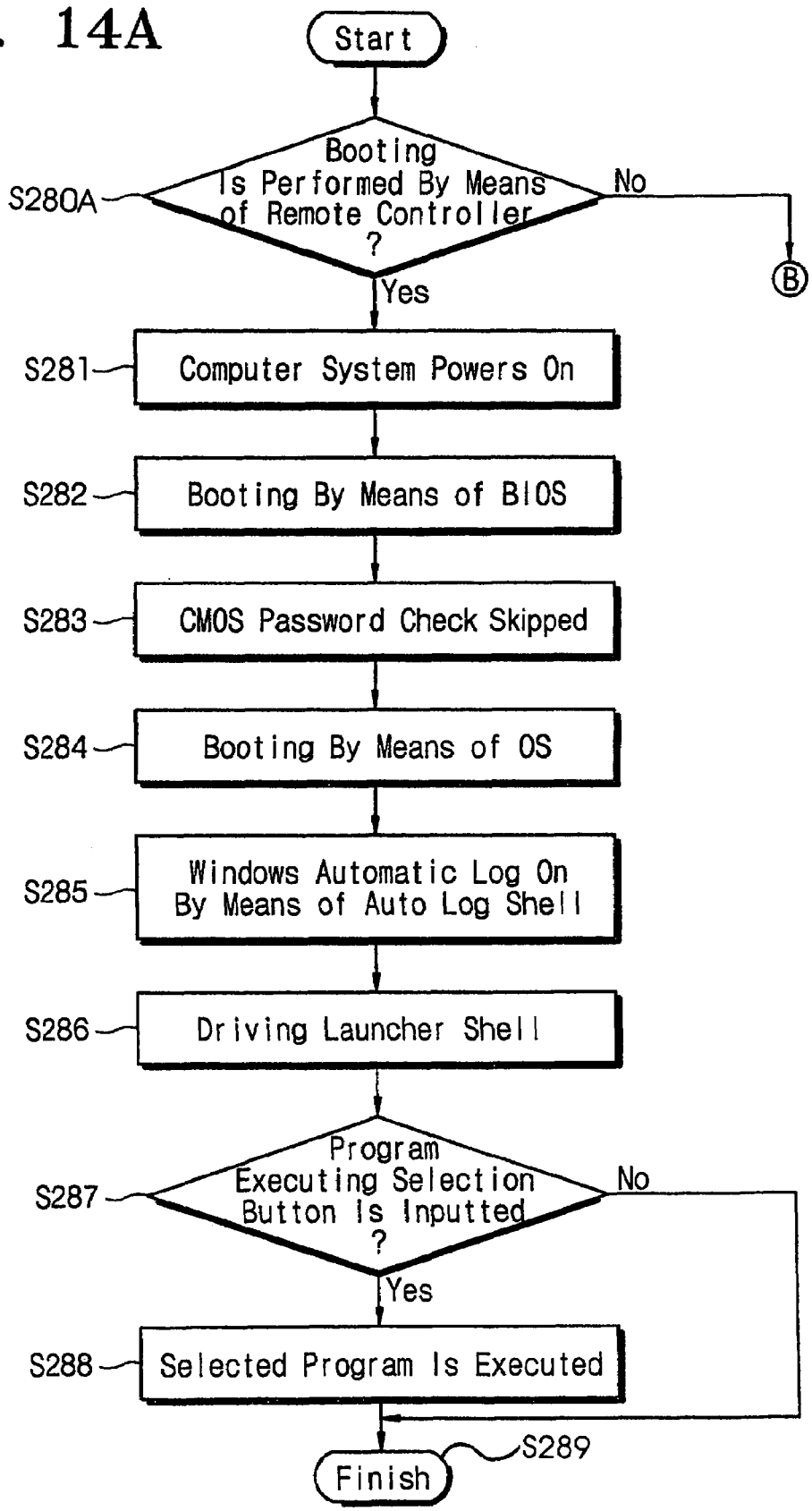
FIG. 14A is a flowchart illustrating the booting steps of a computer system using a remote controller according to the present invention.

FIG. 14A illustrates the booting steps of computer system 200 using remote controller 300, 300'. Referring now to FIG. 14A and FIG. 7, in step S280A, microcontroller 410 determine whether computer system 200 is booted by means of remote controller 300, 300'. If not, step S280A proceeds to step S381 of FIG. 14B. If so, step S280A proceeds to step S281. If one of the command buttons WIN, WIN', PG1, PG1' and PG2, PG2' is selected, power is supplied to computer system 200 in step S281. If the power is supplied to computer system 200, it is also supplied to the hardware layer 500 shown in FIG. 7. Then, in step S282, booting is performed by means of the hardware layer 500 and the BIOS 260, with booting information being stored in the BIOS 260. In this case, the booting routine differs in accordance with whether the booting is performed by means of the remote controller 300, 300' or the power switch 210. Then, in step S283, the checking of a CMOS password set for security is automatically skipped. This is because, if the booting is performed by means of the remote controller 300, 300', the microcontroller 410 determines whether a user identification number stored in the remote controller 300, 300' matches a user identification number stored in the remote control signal receiver 400. If the two user identification numbers match, the computer system 200 regards it as an authorized booting and automatically skips the CMOS password check. Then, proceeding to step S284, the booting is carried out by means of the operating system (OS) of operating system layer 520 shown in FIG. 7. Then, in step S285, automatic log on of the windows is performed by the auto log shell 291. Then, in step S286, a launcher shell program 292 of application layer 530 is driven to automatically execute a program. The before shell 293, including the virtual keyboard driver 290, the auto log shell 291, and the launcher shell program 292, resides in the windows to be displayed with the shape of the tray icon as illustrated in FIG. 8, by way of example. Then, in step S287, the microcontroller 410 determines whether one of the command buttons PG1, PG1' or PG2, PG2' assigning automatic execution of a program is input. If so, then, at step S288, the selected program is automatically executed. The process then ends at step S289. If one of the command buttons is not input, then step S287 proceeds to step S289, and the process is finished.

Figure 14B:
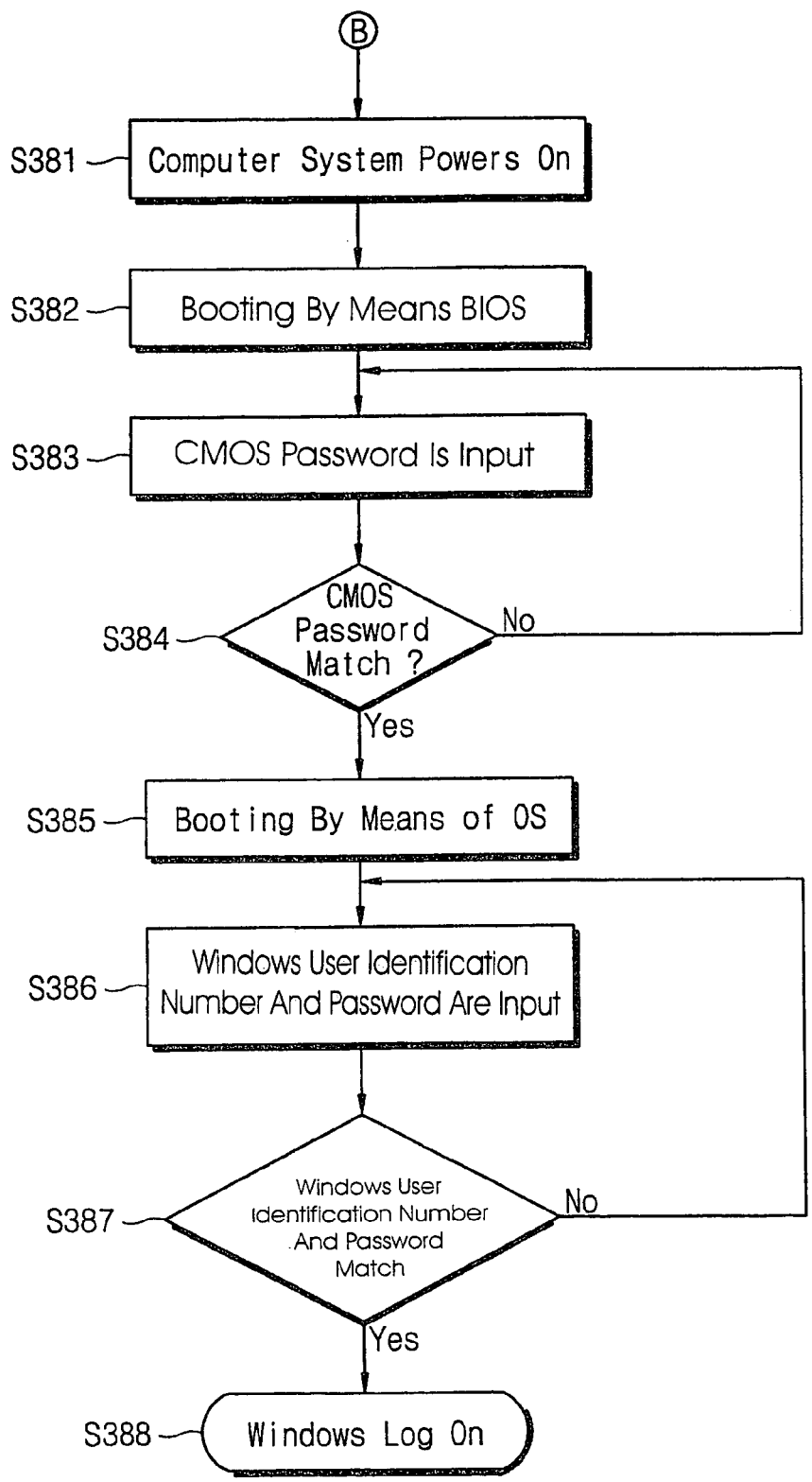
FIG. 14B is a flowchart illustrating the booting steps of a computer system using a power switch according to the present invention.

FIG. 14B illustrates the booting steps of computer system 200 using power switch 210. Referring now to FIG. 14B and FIG. 7, in step S381, if power switch 210 mounted upon the computer system 200 is turned on, power is applied to the computer system 200. Then, in step S382, booting is performed by means of the BIOS 260 shown in FIG. 7. Booting information is stored in the BIOS 260, the booting routine differing in accordance with whether the booting is performed by means of the remote controller 300, 300' or by the power switch 210. Then, in step S383, checking of a CMOS password set for security is performed in accordance with the booting information. Since the booting is not performed by means of the remote controller 300, 300', a user has to personally input the CMOS password through the keyboard 100 (FIG. 6). Then, in step S384, the microcontroller 410 determines whether the input CMOS password matches a CMOS password assigned in the computer system 200. At this time, if the two passwords do not match, step S384 returns to step S383. If the two passwords match, then step S384 proceeds to step S385 to perform the booting by means of the operating system (OS). Then, in step S386, a state window (referring to FIG. 9) for the windows log on is opened, and the user inputs a user identification number and a password through the keyboard 100, in a manner similar to step S383. When the input of step S386 is completed, step S386 proceeds to step S387 to determine whether the input user identification number and password match a user identification number and password previously assigned. If they match, then step S387 proceeds to step S388 to carry out the windows log on. Then, the steps are finished. If they do not match, step S387 returns to step S386.

As mentioned above, following the steps shown in FIG. 14A is more advantageous than following the steps shown in FIG. 14B in that the steps of FIG. 14A provide for a reduction of system booting time and a reduction in program execution time. In this case, a match of two user identification numbers stored in remote controller 300, 300' and remote control signal receiver 400, respectively, is confirmed to provide a security function for computer system 200. Moreover, it is possible to carry out an automatic log on of the windows and batch processing of an assigned program.

Therefore, according to the present invention, remote control of a computer system having a security function can be performed by means of a remote controller. In addition, according to the present invention, it is possible to perform an automatic log on function of an operating system and a batch processing function of an assigned program in the computer system.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention include all embodiments falling within the scope of the appended claims.

What is claimed is:

1. A computer system, comprising:
   a computer having an operating system;
   a remote controller for storing a first user identification number and for generating a remote control signal including said first user identification number and a command code for remote control of said computer;
   a remote control signal receiver connected to said computer for receiving said remote control signal from said remote controller, said remote control signal receiver storing a second user identification number; and
   program driving means for carrying out an operating system automatic log on function of said computer in accordance with said remote control signal of said remote controller when said first user identification number matches said second user identification number;
   said remote controller including a first command button for operator input of a first command to automatically execute an automatic log on of said operating system, and a second command button for operator input of a second command to automatically execute said automatic log on of said operating system followed by automatic execution of a first program.

2. The computer system of claim 1, said program driving means residing in said computer and being displayed with a shape of a tray icon, and said program driving means responding to said command code included in said remote control signal generated by said remote controller by automatically executing an assigned program.

3. The computer system of claim 1, wherein said assigned program automatic execution function includes a batch processing function.

4. The computer system of claim 1, wherein a power state of said computer is one of a normal state, a stand-by state, and a system off state.

5. The computer system of claim 4, a function corresponding to said remote control signal being executed in accordance with said power state of said computer, and said remote control signal not having a turn-off function so as to prevent data loss caused by a shutdown operation of said computer when said remote controller is mistakenly operated.

6. The computer system of claim 1, said remote controller including:
   a first memory for storing said first user identification number;
   a third command button for operator input of a third command to automatically execute said automatic log on function of said computer followed by automatic execution of a second program;
   a first microcontroller for generating said remote control signal, comprising a command code corresponding to a selected one of said first command button, said second command button and said third command button, and comprising said first user identification number stored in said first memory, when one of said first command button, said second command button and said third command button is selected;
   a remote control signal transmission circuit using one of an infrared signal and a radio frequency signal to transmit said remote control signal to said remote control signal receiver of said computer system; and
   a power supply for supplying operating power for said remote controller.

7. The computer system of claim 6, said program driving means residing in said computer and being displayed with a shape of a tray icon, and said program driving means responding to said command code included in said remote control signal generated by said remote controller by automatically executing said assigned program, wherein said first program and said second program assigned through said second command button and said third command button, respectively, are variable.

8. The computer system of claim 6, said remote control signal receiver including:
   a second memory for storing said second user identification number;
   a remote control signal receiving circuit for receiving said remote control signal from said remote controller using one of the infrared signal and the radio frequency signal; and
   a second microcontroller for receiving said remote control signal and a power state signal of said computer, and for determining whether said first user identification number included in said received remote control signal matches said second user identification number stored in said second memory, said second microcontroller inputting said command code to said program driving means when said first user identification number matches said second user identification number.

9. The computer system of claim 8, wherein a power state of said computer is one of a normal state, a stand-by state, and a system off state.

10. The computer system of claim 9, a function corresponding to said remote control signal being executed in accordance with said power state of said computer, and said remote control signal not having a turn-off function so as to prevent data loss caused by a shutdown operation of said computer when said remote controller is mistakenly operated.

11. The computer system of claim 10, a complementary metal oxide semiconductor password check being automatically skipped when said first user identification number matches said second user identification number, and when said computer is booted by means of said remote controller.

12. The computer system of claim 8, said program driving means including:
   a virtual keyboard driver for determining whether said command code included in said remote control signal generated by said remote controller is received by said remote control signal receiver, and then generating a control command when said command code is received by said remote control signal receiver;
   means for responding to said control command by automatically executing an assigned program; and
   auto log means for automatically logging on said operating system when said computer is booted by means of said remote controller and when said first user identification number included in said remote control signal matches said second user identification number of said remote control signal receiver, said auto log means automatically inputting a user identification number and a password necessary for log on of said operating system of said computer.

13. The computer system of claim 12, said program driving means residing in said computer and being displayed with a shape of a tray icon, and said program driving means responding to said command code included in said remote control signal generated by said remote controller by automatically executing said assigned program, wherein said first program and said second program assigned through said second command button and said third command button, respectively, are variable.

14. The computer system of claim 8, a complementary metal oxide semiconductor password check being automatically skipped when said first user identification number matches said second user identification number, and when said computer is booted by means of said remote controller.

15. A computer system, comprising:
   a computer having an operating system;
   a remote controller for storing a first user identification number and for generating a remote control signal including said first user identification number and a command code for remote control of said computer;
   a remote control signal receiver connected to said computer for receiving said remote control signal from said remote controller, said remote control signal receiver storing a second user identification number; and
   program driving means for carrying out an operating system automatic log on function of said computer in accordance with said remote control signal of said remote controller when said first user identification number matches said second user identification number;
   wherein a complementary metal oxide semiconductor password check is automatically skipped when said first user identification number matches said second user identification number, and when said computer is booted by means of said remote controller.

16. A computer system, comprising:
   a computer having an operating system;
   a remote controller for storing a first user identification number and for generating a remote control signal including said first user identification number and a command code for remote control of said computer;
   a remote control signal receiver connected to said computer for receiving said remote control signal from said remote controller, said remote control signal receiver storing a second user identification number; and
   a program driver for carrying out an operating system automatic log on function of said computer in accordance with said remote control signal of said remote controller when said first user identification number matches said second user identification number;
   said program driver including:
      auto log means for automatically logging on said operating system when said computer is booted by means of said remote controller and when said first user identification number included in said remote control signal matches said second user identification number of said remote control signal receiver, said auto log means automatically inputting a user identification number and a password necessary for log on of said operating system of said computer;
      a virtual keyboard driver for determining whether said command code included in said remote control signal generated by said remote controller is received by said remote control signal receiver, and then generating a control command when said command code is received by said remote control signal receiver; and
      means for responding to said control command by automatically executing an assigned programs.

17. The computer system of claim 16, said program driver residing in said computer and being displayed with a shape of a tray icon.

18. A method for remote control of a computer system in response to a remote control signal from a remote controller, comprising the steps of:

checking a signal receiving state of a remote control signal receiver to determine whether said remote control signal is received from said remote controller;

determining whether a first user identification number included in said received remote control signal matches a second user identification number stored in said remote control signal receiver when said remote control signal is received from said remote controller, and placing said computer system in a stand-by mode until said remote control signal is received from said remote controller; and performing an automatic log on of an operating system of said computer system in response to said received remote control signal in accordance with a power state of said computer system when said first user identification number matches said second user identification number, said power state of said computer system being one of a normal state, a stand-by state, and a system off state;

said remote control signal including a first command generated by operator actuation of a first command button of said remote controller so as to carry out said automatic log on of said operating system of said computer system, and a second command generated by operator actuation of a second command button of said remote controller so as to carry out said automatic log on of said operating system of said computer followed by automatic execution of a first program.

19. The method of claim 18, said remote control signal not having a turn-off function so as to prevent data loss caused by a shutdown operation of said computer system when said remote controller is mistakenly operated.

20. The method of claim 18, said remote control signal further including:

a third command generated by operator actuation of a third command button of said remote controller so as to carry out said automatic log on of said operating system of said computer followed by automatic execution of a second program.

21. The method of claim 20, said remote control signal not having a turn-off function so as to prevent data loss caused by a shutdown operation of said computer system when said remote controller is mistakenly operated.

22. The method of claim 20, said carrying out of said automatic log on of said operating system and said automatically executing one of said first program and said second program comprising the steps of:

powering on said computer system;

carrying out booting of said computer system by means of a basic input/output system;

automatically skipping checking of a complementary metal oxide semiconductor password;

carrying out booting of said computer system by means of said operating system;

performing said automatic log on of said operating system by means of auto log means for automatic log on of said operating system;

driving a launcher shell program so as to automatically execute an assigned program;

determining whether one of two operations has occurred, said two operations comprising generation of said second command by operator actuation of said second command button, and generation of said third command by operator actuation of said third command button; and selectively executing said first program when said second command has been generated, and selectively executing said second program when said third command has been generated.

* * * * *